(12) United States Patent
Matsuoka (10) Patent No.: US 8,223,415 B2
(45) Date of Patent: Jul. 17, 2012

(54) SCANNING OPTICAL DEVICE

(75) Inventor: Shohei Matsuoka, Tokyo (JP)

(73) Assignee: Prsym, Inc., San Jose, CA (US)

( * ) Notice: Subject to any disclaimer, the term of this patent is extended or adjusted under 35 U.S.C. 154(b) by 0 days.

(21) Appl. No.: 13/073,930

(22) Filed: Mar. 28, 2011

(65) Prior Publication Data
US 2011/0176191 A1 Jul. 21, 2011

Related U.S. Application Data

(63) Continuation-in-part of application No. PCT/JP2008/067452, filed on Sep. 26, 2008.

(51) Int. Cl.
*G02B 26/08* (2006.01)
(52) U.S. Cl. ........... 359/201.2; 359/197.1; 359/212.1
(58) Field of Classification Search .......... 359/197.1, 359/201.1–202.1, 212.1
See application file for complete search history.

(56) References Cited

U.S. PATENT DOCUMENTS

| | | | |
|---|---|---|---|
| 4,344,695 A * | 8/1982 | Satomi | 399/206 |
| 2005/0012973 A1 * | 1/2005 | Sowa et al. | 359/198 |
| 2005/0088512 A1 | 4/2005 | Nomura et al. | |

FOREIGN PATENT DOCUMENTS

| | | |
|---|---|---|
| JP | 11-196236 A | 7/1999 |
| JP | 2005-106894 A | 4/2005 |

OTHER PUBLICATIONS

International Search Report received for PCT Patent Application No. PCT/JP2008/067452, mailed on Jan. 6, 2009, 2 pages (1 page of English Translation and 1 page of International Search Report).

* cited by examiner

*Primary Examiner* — James Phan
(74) *Attorney, Agent, or Firm* — Patterson & Sheridan, LLP (57) ABSTRACT

A scanning optical device that scans a light beam through a relay optical system, the relay optical system comprising: front group lenses arranged at a light source side; rear group lenses arranged at a side of a surface to be scanned; and first and second mirrors arranged between the front group lenses and the rear group lenses and supported by a common supporting member, wherein a normal vector of a mirror surface of the first mirror makes an angle $(180-\omega)$ with an incident optical axis from the front group lenses, a normal vector of the second mirror makes an angle $\alpha$ ($\alpha \neq 180 \times m$) with the normal vector of the first mirror, and the supporting member includes a mechanism being linearly movable in a direction which makes an angle $(\omega - \alpha + 90)$ with the normal vector of the first mirror.

7 Claims, 4 Drawing Sheets

SCANNING OPTICAL DEVICE

CROSS-REFERENCE TO RELATED APPLICATION

This application is a continuation-in-part of International Application No. PCT/JP2008/067452, filed Sep. 26, 2008. The disclosure of the prior application is incorporated herein by reference in its entirety for all purposes.

TECHNICAL FIELD

The present invention relates to a scanning optical device mounted on an image forming device, such as a laser printer or a projector. Specifically, the present invention relates to a scanning optical device that scans, through a relay optical system, a light beam irradiated from a light source.

BACKGROUND

In an image forming device, such as a laser printer, a projector, or an image scanner, a scanning optical device, such as a two-dimensional scanning device which scans a light beam irradiated from a light source on a surface to be scanned or a multi-beam scanning device, is mounted. In such type of scanning optical device, an optical configuration is adapted in which a relay optical system for adjusting condensing positions is arranged, so as to once condensing the light beam on a deflector arranged in the middle of an optical path extending from the light source to the surface to be scanned. The relay optical system includes a plurality of relay lenses. It is a cause of increasing a size of the scanning optical device. In order to reduce the size of the scanning optical device, folding mirrors for folding the optical path are arranged between the relay lenses of a generic relay optical system.

A focal length of a relay optical system tends to be set to short in comparison with that of a subsequent optical system. Therefore, in order to form an image which is sufficiently focused on an irradiated surface (a surface to be scanned), it is necessary that points of focus of relay lenses are mutually aligned at a high precision. Further, in order to cause the light beam to efficiently enter the relay optical system, or, in order to cause a light beam emitted from the relay optical system to efficiently enter the subsequent optical system, it is necessary to determine a positional relationship among (an entrance pupil or an exit pupil of) the relay optical system and its front and rear optical systems with a high precision. However, it is practically difficult to position the relay lenses with respect to each other with a high precision, while simultaneously determining the positional relationship among the front and rear optical systems with a high precision. For example, when distances between the relay lenses are adjusted through moving the relay lenses so as to adjust the points of focus of the relay lenses with respect to each other, an adverse effect arises such that a conjugate relationship of pupils in front and at rear of the relay optical system changes.

A method of adjusting the points of focus of the relay lenses with respect to each other can be considered such that distances between relay lenses are adjusted by performing a shift adjustment of the folding mirrors, while the relay lenses are fixed. When such a method is adapted, there is an advantage that the positional relationship among the relay optical system and its front and rear optical systems are not changed, since it is not necessary to move the relay lenses themselves, during the adjustment of the points of the relay lenses. On the other hand, in accordance with the shift adjustment of the folding mirrors, the incident positions (reflection positions) of the light beam on the folding mirrors are fluctuated. Another adverse effect arises such that an incident height of the light beam to the subsequent optical systems is fluctuated, in association with the movement the reflection positions of the light beam on the folding mirrors with respect to the relay lenses. Further, when the folding mirrors are inclined by fluctuations of components during the shift adjustment of the folding mirrors, an adverse effect arises such that an angle of the light beam emitted from the relay lenses to the subsequent optical systems is varied.

To prevent such adverse effects from arising, it is considered to adjust the points of focus of the relay lenses by adapting a focus adjustment mechanism disclosed in, for example, Japanese Patent Provisional Publication No. HEI11-196236 (hereinafter, written as patent document 1). The focus adjustment mechanism disclosed in the patent document 1 is configured such that points of focus of the scanning optical system with respect to a document surface is adjusted through adjusting distances among first mirrors installed in respective two mirror supports guided by guide rails and a pair of second mirrors.

However, in the focus adjustment mechanism described in the patent document 1, for example, when the distance between the mirrors is changed by $\Delta D$, the optical length is changed with a twice sensitivity, that is, changed by $\Delta 2D$. Therefore, such a focus adjustment mechanism is not suitable for finely adjusting the points of focus of the relay lenses.

SUMMARY

The present invention is achieved by considering the above described circumstances. Aspect of the present invention are advantageous in that they provide a scanning optical device suitable for finely adjusting distances of relay lenses.

A scanning optical device according to one aspect of the present invention to overcome the above problem is a device that scans a light beam irradiated from a light source through a relay optical system on a surface to be scanned, and having following features. Namely, the relay optical system included in the scanning optical device includes at least one front group lenses arranged at a light source side and at least one rear group lenses arranged at a side of the surface to be scanned. And, the relay optical system includes a first mirror and a second mirror supported by a common supporting member so as to relatively fix their positions with respect to each other, the first mirror and the second mirror being arranged between the front group lenses and the rear group lenses so as to ensure effectiveness of a fine adjustment of a distance between the front group lenses and the rear group lenses. The first mirror is arranged such that a normal vector of a mirror surface of the first mirror makes an angle $(180-\omega)$ (unit: deg) with an incident optical axis of the front group lenses, and folds an incident light beam from the front group lenses. The second mirror is arranged such that a normal vector of a mirror surface makes an angle $\alpha$ ($\alpha \neq 180 \times m$, here m is an integer) (unit: deg) with the normal vector of the mirror surface of the first mirror, and folds the incident light beam from the first mirror toward the rear group lenses. The support member includes a mechanism that is linearly movable in a direction which makes an angle $(\omega - \alpha + 90)$ (unit: deg) with the normal vector of the mirror surface of the first mirror. With such a configuration, the distance between the front group lenses and the rear group lenses can be adjusted with a high precision without changing a positional relationship between an entrance pupil of the front group lenses and an exit pupil of the rear group lenses and a positional relationship among optical systems in front and at rear of the front group lenses and the rear group lenses.

Namely, the scanning optical device according to the present invention, since respective component members are arranged at suitable positions and a single supporting member which supports a plurality of folding mirrors is configured such that the supporting member can be shifted in a predetermined direction, distances between relay lenses can be adjusted with a high precision, without changing the positional relationships among the relay optical system and the optical systems in front and at rear of the relay optical system.

Here, it is preferable that the supporting member includes a mechanism that is also linearly movable in a direction which makes an angle $(\omega-\alpha)$ (unit: deg) with the normal vector of the mirror surface of the first mirror, so that the incident height of the light beam to the rear group lenses can be adjusted without changing the distance between the front group lenses and the rear group lenses.

It is preferable that the scanning optical device according to the present invention satisfies a following inequality:

$$|\sin \alpha| < 0.5,$$

so as to enabling a more finer adjustment of the distance between the front group lenses and the rear group lenses.

It is preferable that the front group lenses and the rear group lenses are substantially telecentric at a side of an image and at a side of an object, respectively, so that a conjugate relationship of the pupils in front and at rear of the relay optical system is not broken (to make it difficult to break).

The scanning optical device according to the present invention can be configured such that the scanning optical device further includes a deflector arranged immediately after the rear group lenses, the deflector deflecting the incident light beam from the rear group lenses so as to scan the incident light beam in a predetermined direction. In this case, it is preferable that the exit pupil of the rear group lenses is placed at a neighborhood of a deflection surface of the deflector. Further, preferably, the scanning optical device is configured such that a line extending the incident optical axis of the front group lenses and the exit pupil intersect at the neighborhood the deflection surface.

Further, a scanning optical device according to an aspect of the present invention to solve the above problem is a device which scans a light beam irradiated from a light source through a relay optical system on a surface to be scanned, the scanning optical device has following features. Namely, a relay optical system included in such a scanning optical device is characterized in that it includes at least one front group lenses arranged at a side of light source, at least one rear group lenses arranged at a side of a surface to be scanned, a first mirror and a second mirror arranged between the front group lenses and the rear group lenses, and supported on a common supporting member so that their positions with respect to each other are relatively fixed, wherein a normal vector of a mirror surface of the first mirror is arranged so as to make an angle $(180-\omega)$ (unit: deg) with respect to an incident angle of the front group lenses, the first mirror folding an incident light beam from the front group lenses, wherein a normal vector of mirror surface of the second mirror is arranged to make an angle $\alpha$ ($\alpha \neq 180 \times m$, here m is an integer) (unit: deg) with the normal vector of the mirror surface of the first mirror, the second mirror folding the incident light beam from the first mirror toward the rear group lenses, and wherein the support member is characterized in that it has a mechanism which is linearly movable in a direction which makes an angle $(\omega-\alpha)$ with the normal vector of the mirror surface of the first mirror.

DETAILED DESCRIPTION OF EMBODIMENTS

Hereinafter, a scanning optical device of an embodiment of the present invention is explained with reference to figures.

Figure 1:
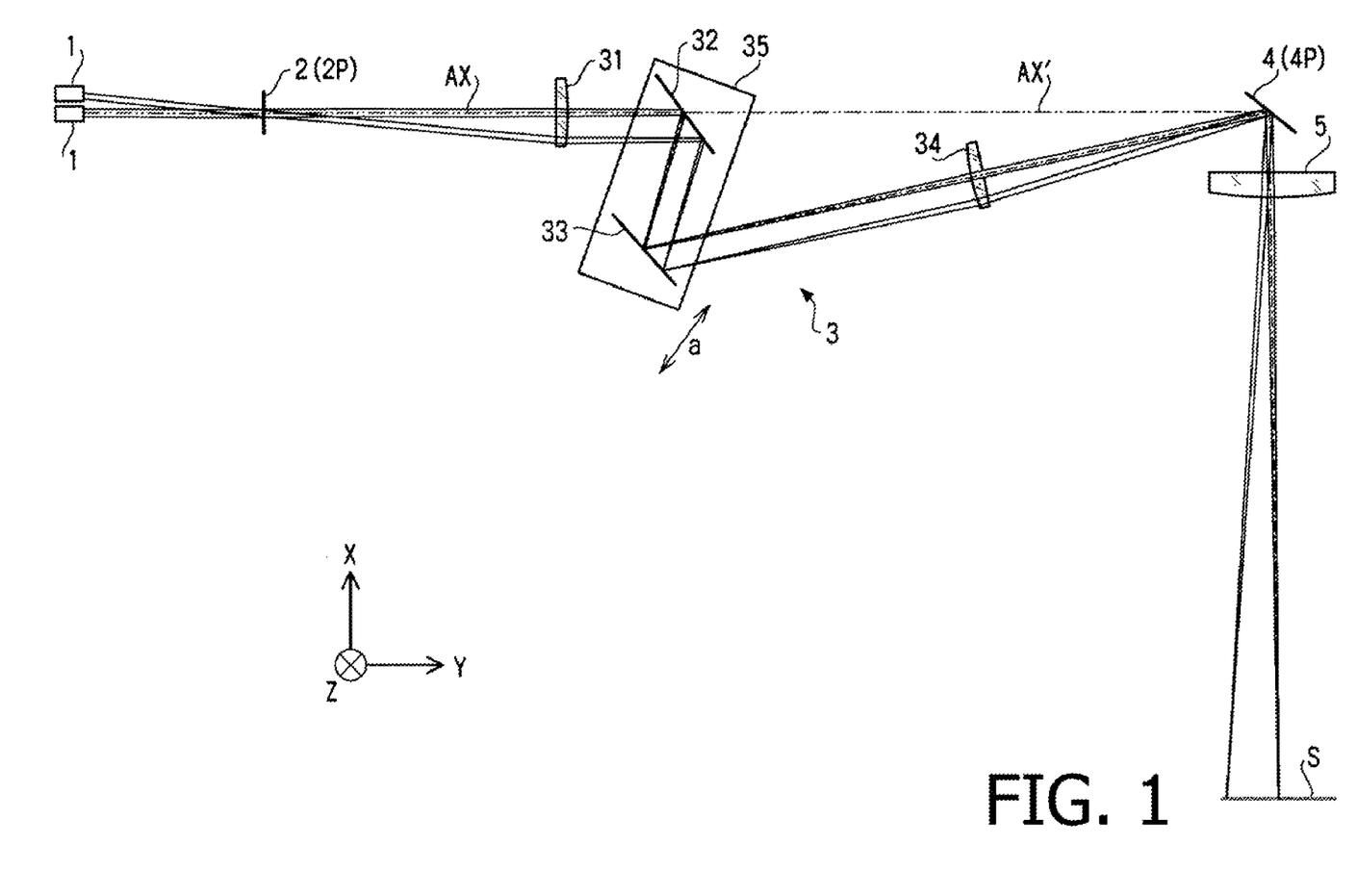
FIG. 1 is a main scanning plane view schematically showing a configuration of a two-dimensional scanning optical device of an embodiment of the present invention.

FIG. 1 is a diagram schematically showing a configuration of a two-dimensional scanning optical device 100, which is an example of a device in which a scanning optical device of an embodiment of the present invention is mounted. Here, in the specification, a direction perpendicular to a plane of paper in FIG. 1 is defined to be a "Z-direction," a first direction parallel to the plane of paper (a direction perpendicular to a surface to be scanned (a screen S) described below) in FIG. 1 is defined to be an "X-direction," and a second direction parallel to the plane of paper and perpendicular to the first direction in FIG. 1 is defined to be a "Y-direction." Further, the Y-direction is defined as a "main scanning direction," and the Z-direction is defined as an "auxiliary-scanning direction." A dashed line in FIG. 1 is a central axis (an optical axis) AX of the two-dimensional scanning optical device 100. In a state in which a light path of the two-dimensional scanning optical device 100 is laid out, a plane including the central axis AX of the two-dimensional scanning optical device 100 and the main scanning direction is defined as a main scanning plane, and a plane including the central axis AX and the auxiliary-scanning direction is defined as an auxiliary-scanning plane. According to such definitions, FIG. 1 is a main scanning plane view schematically showing the configuration of the two-dimensional scanning optical device (however, an XY stage 35 described below is shown in the figure for convenience, the XY stage 35 actually is arranged at a position separated from the main scanning plane (namely, the central axis AX)).

As shown in FIG. 1, the two-dimensional scanning optical device 100 includes a plurality of light source parts 1 (two, here) to irradiate laser beams. Each of the light source parts 1 has the same configuration, and arranged in line on the main scanning plane. The two-dimensional scanning optical device 100 further includes, from a side of the light source parts 1, a deflector for auxiliary-scanning 2, a relay optical system 3, a deflector for main scanning 4, a scanning optical system 5, and the screen S, in this order.

Each of the light source parts 1 irradiates a laser beam modulated in accordance with an image signal output from an image processing circuit, which is not shown in figures. Laser beams irradiated from respective light source parts 1 are incident on a deflection surface 2P of the deflector for auxiliary-scanning 2.

The deflector for auxiliary-scanning 2 is a deflector (a galvano mirror) configured such that the deflector surface 2P oscillates at a high speed on the auxiliary-scanning plane, and it scans a laser beam incident on the deflection surface 2P in the auxiliary-scanning direction with respect to the screen S. A laser beam incident on the deflection surface 2P enters the relay optical system 3 while continuously deflected at angles corresponding to states of the oscillation by the deflection surface 2P.

The relay optical system 3 includes, from a side of the deflector for auxiliary-scanning 2, a condensing lens 31, folding mirrors 32 and 33, and a condensing lens 34, in this order. The folding mirrors 32 and 33 are supported on the known XY stage 35 in a state in which reciprocal positions of the mirrors are relatively fixed. The XY stage 35 is configured such that the positions of the folding mirrors 32 and 33 are relatively shifted with respect to the condensing lens 31 or the condensing lens 34, by moving (shifting) the folding mirrors 32 and 33 supported on the XY stage 35 in a direction of an arrow a in FIG. 1. Here, in the embodiment, the relay optical system 3 is shown as a configuration in which there is one lens in front of the folding mirrors 32 and 33, and there is one lens at rear of the folding mirrors 32 and 33. However, such number of lenses is an example only. A configuration of the relay optical system 3 can be considered such that there are a plurality of lenses in front of the folding mirrors 32 and 33, and there are a plurality of lenses at rear of the folding mirrors 32 and 33.

A laser beam incident on the condensing lens 31 is folded by the folding mirrors 32 and 33, after that the laser beam is incident on a deflection surface 4P of the deflector for main scanning 4 through the condensing lens 34. Here, the laser beam incident on the condensing lens 31 once forms an intermediate image in a light path with a power of the condensing lens 31, prior to entering the condensing lens 34. Non-collimated beams (here, converging beams) are incident on the folding mirrors 32 and 33.

The condensing lens 31 is substantially telecentric at a side of image (i.e., at an exit side), and the condensing lens 34 is substantially telecentric at a side of an object (i.e., an entrance side). Therefore, even when the folding mirrors 32 and 33 are shifted in the direction of the arrow a, distance between images of respective laser beams formed on respective folding mirrors is kept substantially constant.

The deflector for main scanning 4 is a deflector (for example, a polygon mirror) configured to rotatable on the main scanning plane, and it scans a laser beam incident on the deflection surface 4P of the deflector for main scanning 4 in the main scanning direction with respect to the screen S. The laser beam incident on the deflection surface 4P enters the scanning optical system 5 while continuously deflected at angles corresponding to rotational states of the deflector for main scanning 4.

Here, the deflector for auxiliary-scanning 2 is configured such that an entrance pupil of the relay optical system 3 (the condensing lens 31) substantially coincides with the deflection surface 2P of the deflector for auxiliary-scanning 2. Further, the deflector for main scanning 4 is configured such that an exit pupil of the relay optical system 3 (condensing lens 34) substantially coincides with the deflection surface 4P of the deflector for main scanning 4. Namely, the deflection surface 2P of the deflector for auxiliary-scanning 2 and the deflection surface 4P of the deflector for main scanning 4 are placed at optically conjugate positions by the relay optical system 3. By placing the positions of the entrance pupil and the exit pupil of the relay optical system 3 at the deflection surfaces of the respective deflectors, laser beams deflected by the deflection surface 2P are incident on the deflection surface 4P without an exception. However, it is not necessary that such positions of the entrance pupil and the exit pupil exactly coincide with the deflection surfaces of the respective deflectors. There is no effect on optical performance of the two-dimensional scanning optical device, as long as the position of the entrance pupil and the position of the exit pupil approximately correspond to the deflection surfaces of the respective deflectors.

An extension line AX' (a two-dot-dashed line) shown in FIG. 1 is a line extending the central axis AX, which extends from the light source part 1 to the condensing lens 31, to a side of the deflector for main scanning 4. As shown in FIG. 1, the extension line AX' intersects with the deflection surface 4P of the deflector for main scanning 4. Additionally, the central axis AX and the extension line AX', which are extending from the folding mirror 33 to the condensing lens 34, intersect with each other at a neighborhood of the deflection surface 4P of the deflector for main scanning. When such a configuration is adapted, a positional relationship of an optical system from the light source part 1 to the condensing lens 31 and the deflector for main scanning 4 can be easily aligned during an assembling process of the two-dimensional scanning optical device 100. Specifically, the light source part 1, the deflector for auxiliary-scanning 2, and the deflector for main scanning 4 are assembled, prior to assembling the folding mirror 32 (or the XY stage 35 to which the folding mirrors 32 and 33 are mounted) to a chassis of the two-dimensional scanning optical device (not shown in the figures). Next, the light source parts 1 are activated and laser beams are emitted. Then, it is examined whether the laser beams emitted from the light source parts 1 are deflected by the deflection surface 2P of the deflector for auxiliary-scanning and irradiated on the deflection surface 4P of the deflector for main scanning 4. By adjusting a position of the deflector for auxiliary-scanning 2 so that positions on the deflection surface 4P where such laser beams are irradiated become normal positions, the position of the deflector for auxiliary-scanning 2 is highly accurately determined. Thus, accuracies of optical paths of the laser beams, that are immediately after emitted, are ensured.

After adjusting the position of the deflector for auxiliary-scanning 2, the condensing lens 31 is attached to the chassis of the two-dimensional scanning optical device 100. Then, it is examined whether laser beams deflected by the deflection surface 2P of the deflector for auxiliary-scanning 2 and incident on the condensing lens 31 are irradiated on the deflection surface 4P of the deflector for main scanning 4. A position of the condensing lens 31 is highly accurately determined by adjusting the position of the condensing lens 31 so that positions on the deflection surface 4P, where such laser beams are irradiated, become normal positions.

Here, when a configuration is such that the deflector for main scanning 4 is not placed on the extension line AX', an optical path to a main scanning deflector are not established until the deflector for auxiliary-scanning 2 and the folding mirrors 32 and 33 are simultaneously placed. Thus, it is not possible to identify which one of the deflector for auxiliary-scanning and the folding mirrors 32 and 33 has an error, during adjustment. In the configuration of the embodiment, the condensing lens 31 can be positioned at a normal position by examining, similarly, whether laser beams are irradiated on the deflection surface 4P, by placing the condensing lens 31 after determining a positional relationship of the deflector for auxiliary-scanning 2 and the deflector for main scanning 4 during the above adjustment.

The scanning optical system 5 includes a plurality of lenses (in FIG. 1, one lens for convenience) and the scanning optical system 5 has an f-θ characteristic as a whole. By such an f-θ characteristic, laser beams emitted from the scanning optical system 5 are scanned on the screen S in the main scanning direction at a substantially constant speed.

In the two-dimensional scanning optical device 100, it is configured such that the deflector for auxiliary-scanning 2 rotates by a predetermined amount per one scanning in the main scanning direction by the deflector for main scanning 4. The predetermined amount is defined to be an amount corresponding to a length which is a number of laser beams arranged in line in the auxiliary-scanning direction (in the embodiment, since each of the light source parts 1 is arranged on the main scanning plane, a number of laser beams arranged in line in the auxiliary-scanning direction is one) times a size of a spot formed by each of the laser beams on the screen S. A two-dimensional image is formed on the screen S by performing such scanning in the main scanning direction, while simultaneously performing scanning in the auxiliary-scanning direction. Namely, unlike a rotatable photosensitive drum, the screen S which is the surface to be scanned in the embodiment is fixed with respect to the scanning optical system 5.

Figure 2:
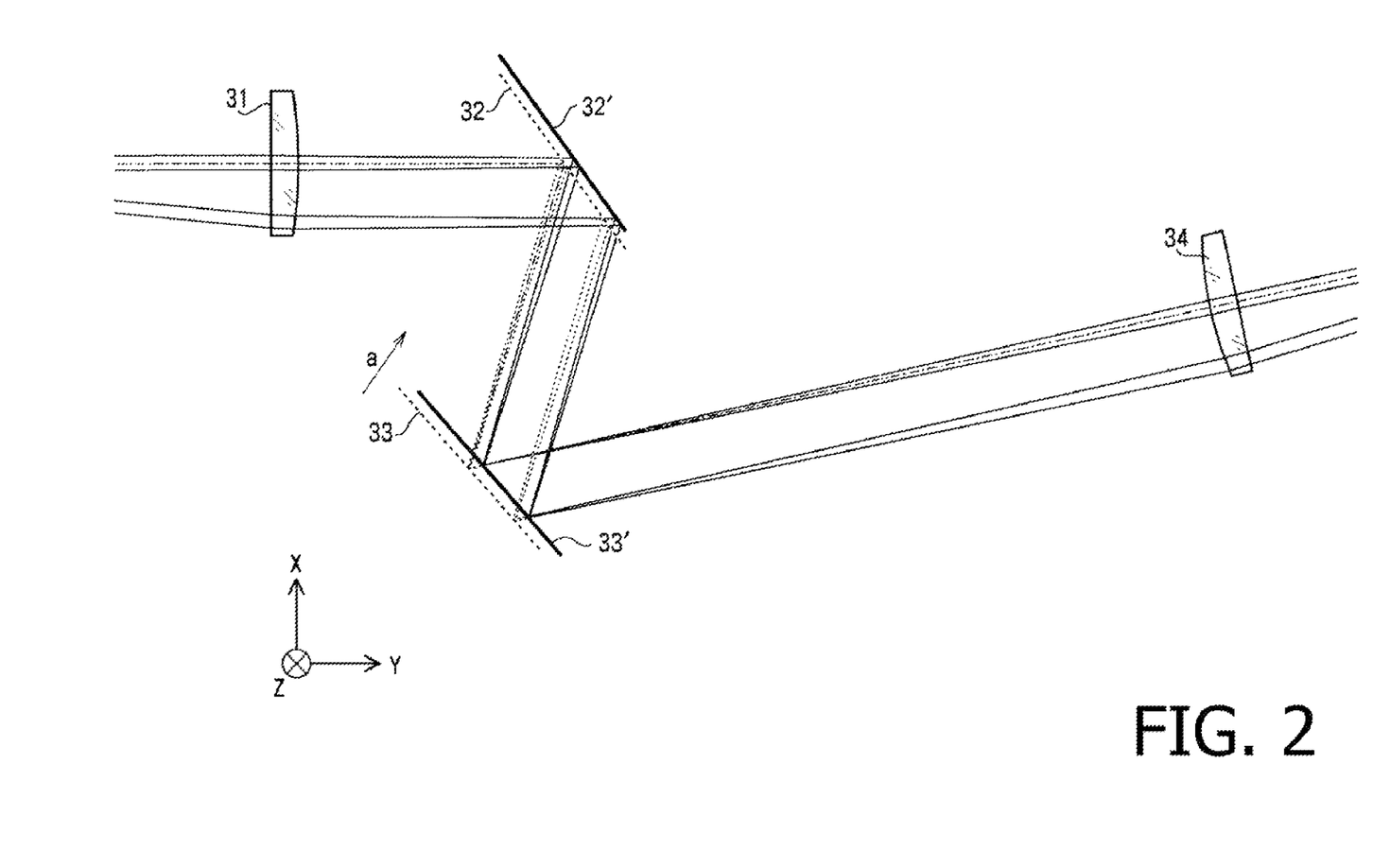
FIG. 2 is a diagram showing a neighborhood of a relay optical system, which is magnified, included in the two-dimensional scanning optical device of the embodiment of the present invention.

Next, a configuration of the relay optical system 3 is explained in detail. The relay optical system 3 is configured such that a length of an optical path from the condensing lens 31 to the condensing lens 34 (in another words, points of focuses of the condensing lens 31 and the condensing lens 34) can be finely adjusted, while the positions of the entrance pupil and the exit pupil are coincided with the deflection surfaces of the respective deflectors. FIG. 2 is a main scanning plane view magnifying and showing a neighborhood of the relay optical system 3. Further, in FIG. 2 and subsequent respective figures, the XY stage 35 is not shown.

FIG. 2 shows the positions of the folding mirrors 32 and 33 before and after moving the folding mirrors 32 and 33 in the direction of the arrow a with the XY stage 35, and optical paths of laser beams irradiated from the respective light source parts 1. In FIG. 2, optical paths of the respective laser beams before shifting the folding mirrors 32 and 33 are shown by dashed lines, and optical paths of the respective laser beams after shifting the folding mirrors 32 and 33 are shown by solid lines. When the optical paths of the respective laser beams before and after shifting the folding mirrors 32 and 33 are overlapped, the optical paths are shown by solid lines. Additionally, the folding mirrors 32 and 33 before shifting are shown with dashed lines, and the folding mirrors 32' and 33' after shifting are shown with solid lines, respectively.

As shown in FIG. 2, entrance positions of laser beams with respect to the folding mirrors 32 and 33 are fluctuated before and after shifting the folding mirrors 32 and 33. Therefore, a length of such a laser beam before and after shifting the folding mirrors 32 and 33 is fluctuated. On the other hand, entrance positions and angles of laser beams with respect to the condensing lens 34 are substantially not fluctuated before and after shifting the folding mirrors 32 and 33. Namely, in the two-dimensional scanning optical device 100, the length of the optical path from the condensing lens 31 to the condensing lens 34 (hereinafter written as "an optical path length between condensing lenses," for convenience) can be adjusted in accordance with amounts of the shifts of the folding mirrors 32 and 33, while the positions of the entrance pupil and the exit pupil of the relay optical system 3 are substantially coincided with the deflection surfaces of the respective deflectors.

Here, the folding mirror 32 extends (or shortens) the optical path lengths between condensing lenses by being shifted as if the folding mirror 32 moves away (or runs away) from the incident beams (or approaches to (reaches to) the incident beams). Conversely, the folding mirror 33 shortens (extends) the optical path lengths between condensing lenses by being shifted as if the folding mirror 33 approaches to (reaches to) the incident beams (or moves away (or runs away) from the incident beams). Namely, the optical path lengths from the condensing lens 31 to the folding mirror 32 and the optical path lengths from the folding mirror 33 to the condensing lens 34 are extended and shorted as if they are cancelling out with each other. Therefore, amounts of changes in the optical path lengths between the condensing lenses with respect to the amounts of shifts of the folding mirrors 32 and 33 are small. Namely, in the two-dimensional scanning optical device 100, since sensitivity of the fluctuation of the optical path lengths with respect to amounts of the shifts of the folding mirrors 32 and 33 is low, the optical path lengths between the condensing lenses can be finely adjusted.

Figure 3:
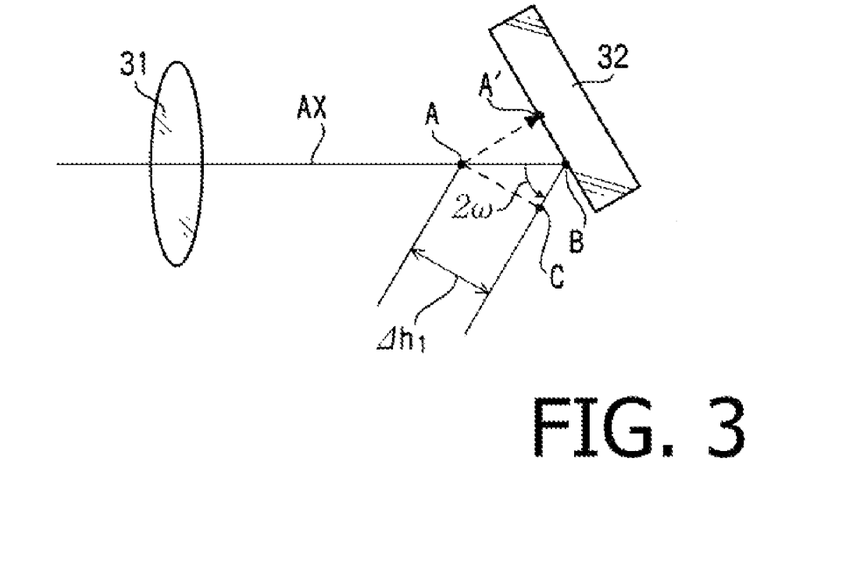
FIG. 3 is a diagram concretely explaining a direction of an arrow satisfying a predetermined condition.
Figure 4:
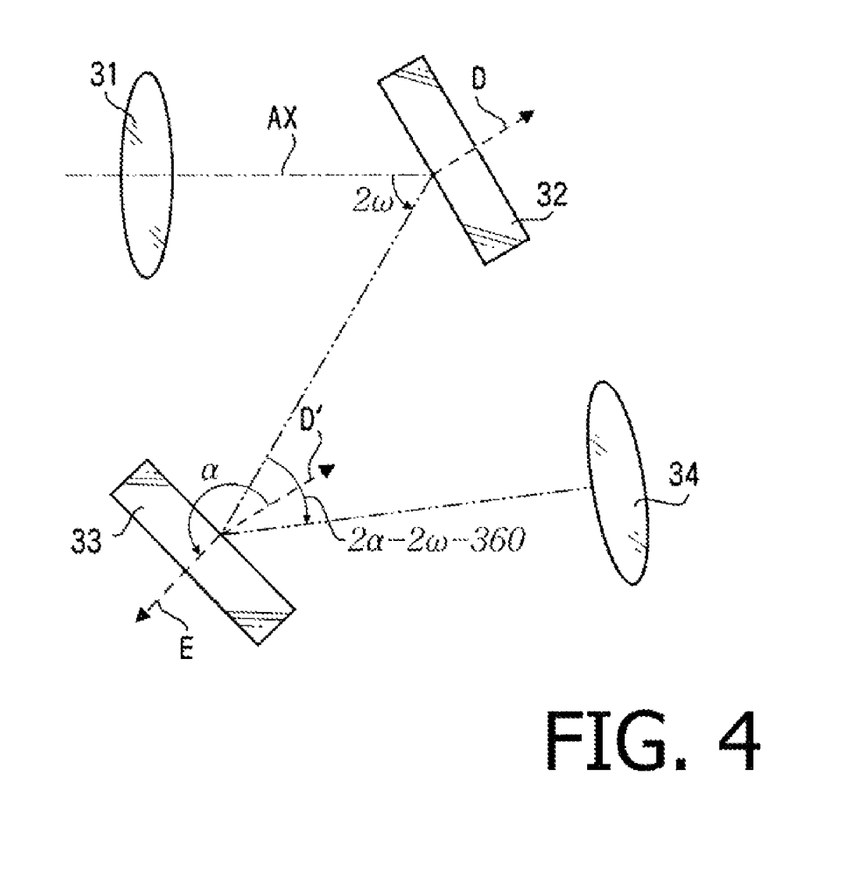
FIG. 4 is a diagram concretely explaining the direction of the arrow satisfying the predetermined condition.
Figure 5:
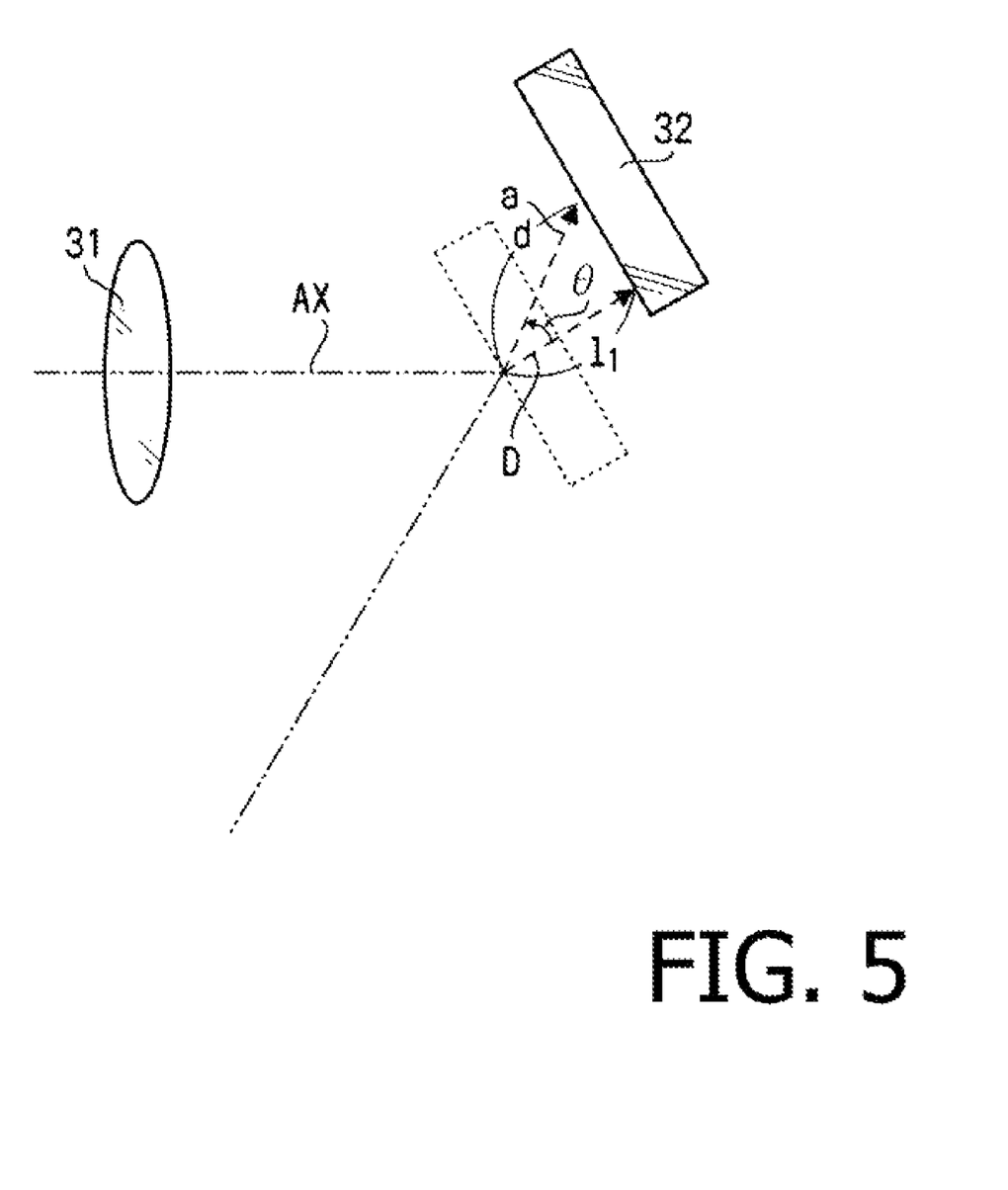
FIG. 5 is a diagram concretely explaining the direction of the arrow satisfying the predetermined condition.

In order to ensure viability of the fine adjustment of the optical path lengths between condensing lenses explained above, it is required that the direction of the arrow a, that is the direction in which the folding mirrors 32 and 33 are shifted by the XY stage 35, satisfies a predetermined condition. FIGS. 3 to 5 are diagrams for concretely illustrating the direction of the arrow a satisfying such condition. Each of FIGS. 3 to 5 is a main scanning plane view.

When the folding mirror 32 is moved in the direction of arrow a by the XY stage 35, a moving distance of a mirror surface of the folding mirror 32 in a normal direction is defined as $l_1$. For example, in FIG. 3, a distance AA' from a point A to a point A' is the moving distance $l_1$. The moving distance $l_1$ becomes a positive value when the folding mirror 32 is shifted in a direction in which the folding mirror 32 is separated from the condensing lens 31, and becomes a negative value when the folding mirror 32 is shifted in a direction in which the folding member 32 approaches to the condensing lens 31. The two-dot-dashed line in FIG. 3 shows an optical path of a laser beam before shifting the folding mirror 32 (here the same as the central axis AX), and the solid line in FIG. 3 shows an optical path of a laser beam after shifting the folding mirror 32 in the direction of the arrow a, respectively. As shown in FIG. 3, before the folding mirror 32 is shifted, a laser beam is reflected at the point A, and moves toward the folding mirror 33. On the other hand, after the folding mirror 32 is shifted, a laser beam passes through the point A and reflects at a point B, after that, the laser beam passes through a point C and moves toward the folding mirror 33.

Here, the movement of the folding mirror 32 is a shift in the direction of the arrow a with respect to other optical elements such as the condensing lens 31, and does not include a tilt. Therefore, an angle between the mirror surface of the folding mirror 32 and the condensing lens 31 does not change before and after shifting the folding mirror 32. Therefore, when the folding mirror 32 is shifted, an incident point of a laser beam to the folding mirror is changed, but a reflection angle of a laser beam reflected by the mirror surface is substantially unchanged. Specifically, the folding mirror 32 reflects a laser beam incident on the mirror surface so that the laser beam moves at a position shifted by $\Delta h_1$ (a height corresponding to a distance from the point A to the point C in FIG. 3) in a direction perpendicular to the central axis AX, in accordance with an amount of the shift in the direction of the arrow a.

As shown in FIG. 4, when a reflection angle of a laser beam on the mirror surface of the folding mirror 32 is defined by 2ω, the amount of the shift $\Delta h_1$ is expressed by a formula (1) below. Further, an angle between the central axis and a normal vector D described below is 180−ω (unit: deg). Additionally, in the following explanations of each of FIGS. 3 to 5, a counterclockwise angle with respect to an incident angle of a laser beam incident on the mirror surface is defined to be a positive angle, and a clockwise angle with respect to an angle of a laser beam incident on the mirror surface is defined to be a negative angle.

$$\Delta h_1 = l_1 \cdot 2 \sin \omega \tag{1}$$

As shown in FIG. 3, when the folding mirror 32 is shifted, a length of an optical path of a laser beam is extended by a distance AB from the point A to the point B and a distance BC from the point B to the point C with respect to a length of an optical path before the folding mirror 32 is shifted. When the mirror 32 is shifted and when an amount of change of the length of the optical path of the laser beam is defined by $\Delta OPD_1$, the amount of change of the length of the optical path $\Delta OPD_1$ is expressed by a following formula (2).

$$\Delta OPD_1 = l_1 \cdot \frac{1 + \cos 2\omega}{\cos \omega} = l_1 \cdot 2\cos\omega \tag{2}$$

The symbol D (D') and the symbol E shown in FIG. 4 show normal vectors of the mirror surfaces of the folding mirrors 32 and 33, the normal vectors having components in directions to pass through main bodies of the folding mirrors from the sides of the mirror surfaces. As shown in FIG. 4, the normal vector D' and the normal vector E make an angle $\alpha$ (unit: deg). The angle $\alpha$ shows a counterclockwise rotational angle of the mirror surface of the folding mirror 33 with respect to the mirror surface of the folding mirror 32. Here, $\alpha \neq 180 \times m$ (m is an integer). Namely, the folding mirror 32 and the folding mirror 33 are arranged such that their mirror surfaces are not in parallel.

A reflection angle of a laser beam on the mirror surface of the folding mirror 33 is defined by $2\alpha - 2\omega - 360$ (in other words, both of an incident angle and an exit angle with respect to the mirror surface of the folding mirror 33 are $\alpha - \omega - 180$) (unit: deg). Here, as described above, the folding mirror 33 is shifted while it is fixed relative to the folding mirror 32. Therefore, when the folding mirror 33 is shifted, an incident point of a laser beam with respect to the folding mirror 33 fluctuates in accordance with the fluctuation of an incident point of a laser beam with respect to the folding mirror 32, but a reflection angle of a laser beam reflected by the mirror surface of the folding mirror 33 is substantially unchanged. In addition, an angle which is made by the mirror surface of the folding mirror 33 with respect to the condensing lens 34 is unchanged before and after the shifting of the folding mirror 33. Therefore, when the folding mirror 33 is shifted, an incident angle of a laser beam with respect to the condensing lens 34 is substantially unchanged.

When the folding mirror 33 is shifted in the direction of the arrow a and when an amount of a shift of a laser beam reflected by the mirror surface of the folding mirror 33 in a direction perpendicular to the central axis AX is defined as $\Delta h_2$, the amount of the shift $\Delta h_2$ is expressed by a following formula (3).

$$\Delta h_2 = -l_2 \cdot 2 \sin(\alpha - \omega - 180) = l_2 \cdot 2 \sin(\alpha - \omega) \tag{3}$$

Further, similarly to $\Delta OPD_1$, when the folding mirror 33 is shifted and when an amount of change of a length of an optical path of a laser beam is defined as $\Delta OPD_2$, the amount of the change of the length of the optical path $\Delta OPD_2$ is expressed by a following formula (4).

$$\Delta OPD_2 = -l_2 \cdot 2 \cos(\alpha - \omega 180) = -l_2 \cdot 2 \cos(\alpha - \omega) \tag{4}$$

As shown in FIG. 5, when an amount of a shift of the folding mirror 32 by the XY stage 35 is defined as d and when an angle which is made by a direction of the shift of the folding mirror 32 (that is the direction of the arrow a) with respect to the normal vector D is defined as $\theta$ (unit: deg), a following formula (5) is satisfied.

$$l_1 = d \cdot \cos \theta \tag{5}$$

Additionally, when the above angle is defined as $\theta$ (unit: deg), an angle made by a shift direction of the folding mirror 33 (that is the direction of the arrow a) with respect to the normal vector E is defined as $\theta - \alpha$ (unit: deg).

$$l_2 = d \cdot \cos(\theta - \alpha) \tag{6}$$

By substituting the formula (5) in the formula (1) and substituting the formula (6) in the formula (3), following formulas are obtained.

$$\Delta h_1 = d \cdot \cos \theta \cdot 2 \sin \omega \tag{7}$$

$$\Delta h_2 = d \cdot \cos(\theta - \alpha) \cdot 2 \sin(\alpha - \omega) \tag{8}$$

In order to change the optical path length between condensing lenses, while the exit pupil of the condensing lens 34 is coincided with the deflection surface 4P of the deflector for main scanning 4, it is necessary to keep a height and an angle of an incident of the laser beam with respect to the condensing lens 34 substantially constant before and after shifting of the folding mirrors 32 and 33. To do so, it is required to set the angle $\theta$ to an angle satisfying a following formula (9)

$$\Delta h_1 + \Delta h_2 = d \cdot \cos \theta \cdot 2 \sin \omega + d \cdot \cos(\theta - \alpha) \cdot 2 \sin(\alpha - \omega) = 0 \tag{9}$$

Namely, the height and the angle of the incident of the laser beam are substantially not fluctuated and only the optical path length between condensing lenses is fluctuated, when both the folding mirrors 32 and 33 are shifted and when the amounts $\Delta h_1$ and $\Delta h_2$ of the shifts of a laser beam in the direction perpendicular to the central axis AX are cancelled out and their additional value becomes 0. The angle $\theta$ which satisfies the formula (9) is $90 + \alpha - \omega$ (unit: deg). By setting the direction of the arrow a so as to satisfy such an angle $\theta$, the optical path length between condensing lenses can be finely adjusted, while the positions of the entrance pupil and the exit pupil of the relay optical system 3 are substantially coincided with the deflection surfaces of the respective deflectors.

Here, an amount of change of the length of the optical path with respect to the shift amount d of the folding mirrors 32 and 33 by the XY stage 35 ($\Delta OPD_1 + \Delta OPD_2$) satisfies a following formula (10).

$$\Delta OPD_1 + \Delta OPD_2 = 2d \cdot \sin \alpha \tag{10}$$

In order to further lower the adjustment sensitivity of the optical path length between the condensing lenses with respect to the amount of the shift d (for example, to make the amount of change ($\Delta OPD_1 + \Delta OPD_2$) of the optical path length between the condensing lenses small with respect to the amount of the shift d), it is preferable that a following formula (11) is satisfied.

$$|\sin \alpha| < 0.5 \tag{11}$$

Further, for example, a case is considered in which the XY stage 35 is placed inclined to a designed position in the main scanning plane, because of a fluctuation. In such a case, an inclination angle (from a designed angle) of the mirror surface of the folding mirror 32 with respect to the condensing lens 31 is cancelled out by an inclination angle (from a designed angle) of the mirror surface of the folding mirror 33 with respect to the condensing lens 34. Further, an angle between mirror surfaces of the folding mirrors 32 and 33 is constant. Therefore, when the XY stage 35 is placed inclined to the designed position because of the fluctuation, an incident height of the laser beam with respect to the condensing lens 34 fluctuates, but it has an advantage such that an incident angle of the laser beam does not fluctuate.

A numerical configuration of a concrete example corresponding to the two-dimensional scanning optical device 100 of the embodiment explained above is shown in Table 1.

TABLE 1

| | |
|---|---|
| d | 3 mm |
| θ | 60 deg |
| | 1.047 rad |
| A | 186 deg |
| | 3.246 rad |
| Ω | 36 deg |
| | 0.628 rad |
| $\Delta h_1$ | 1.763 mm |
| $\Delta h_2$ | −1.763 mm |
| $\Delta h_1 + \Delta h_2$ | 0 mm |
| Change in height on image plane | 0 mm |
| $\Delta OPD_1$ | 2.427 mm |
| $\Delta OPD_2$ | −3.054 mm |
| $\Delta OPD_1 + \Delta OPD_2$ (movement of the point of focus of the relay optical system) | −0.627 mm |
| Movement of the point of focus on image plane | 2.509 mm |

In such a case, the XY stage 35 is shifted by 3.0 mm, but a change in the optical path length between the condensing lenses (that is, movements of the position of focus of the condensing lens 31 and the position of focus of the condensing lens 34) is only −0.627 mm. Thus, it can be seen that an adjustment sensitivity of the optical path length between the condensing lenses is kept at a low level. In this case, no change in height on an image plane is generated (namely, a position of a spot of a laser beam formed on the screen S in the main scanning direction is unchanged) and the position of focus of the laser beam extends by 2.509 mm with respect to the screen S. It has an advantage such that the movement of the position of focus of the laser beam with respect to the screen S, the movement being highly sensitive, can be easily adjusted, by keeping the adjustment sensitivity of the optical path length between the condensing lenses with respect to the shift amount d at a low level.

The embodiment of the present invention is described above. The two-dimensional scanning optical device according to the present invention is not limited by the above configuration, but various modifications are possible within the scope of the technical concept of the invention.

For example, when the direction in which the folding mirrors 32 and 33 are shifted by the XY stage 35 is set to a direction which satisfies a condition which is different from above described condition, it is possible that only an incident height of a laser beam with respect to the condensing lens 34 is changed, while the optical length between the condensing lenses is substantially kept at a constant length.

Specifically, when an angle made by the shift direction of the folding mirror 32 with respect to the normal vector D is defined as θ' (unit: deg), following formulas (12) and (13) are satisfied.

$$l_1 = d \cdot \cos \theta' \quad (12)$$

$$l_2 = d \cdot \cos(\theta' - \alpha) \quad (13)$$

Next, by substituting the formula (12) in the formula (2) and substituting the formula (13) in the formula (4), following formulas are obtained.

$$\Delta OPD_1 = d \cdot \cos \theta' \cdot 2 \cos \omega \quad (14)$$

$$\Delta OPD_2 = -d \cdot \cos(\theta' - \alpha) \cdot 2 \cos(\alpha - \omega) \quad (15)$$

In order that only the incident height of the laser beam with respect to the condensing lens 34 is changed, while the optical path length between the condensing lenses is substantially kept at constant length before and after shifting the folding mirrors 32 and 33, it is necessary that the angle θ' is set to an angle which satisfies a formula (16) below.

$$\begin{aligned}\Delta OPD_1 + \Delta OPD_2 &= d \cdot \cos\theta' \cdot 2\cos\omega - d \cdot \cos(\theta' - \alpha) \cdot \\ &\quad 2\cos(\alpha - \omega) \\ &= 2d \cdot \sin\alpha \cdot 2\sin(\theta' - \alpha + \omega) \\ &= 0\end{aligned} \quad (16)$$

Namely, when the amounts of changes $\Delta OPD_1$ and $\Delta OPD_2$ of the optical path length between the condensing lenses, which are associated with the shifts of the respective folding mirrors 32 and 33, are cancelled out and their additional value becomes 0, the optical path length between the condensing lenses is substantially unchanged and only the incident height of the laser beam with respect to the condensing lens 34 is changed. The angle θ' which satisfies the formula (16) is α·ω (unit: deg). Here, it is likely that an incident height of a laser beam with respect to the condensing lens 34 varies because of, for example, fluctuations of respective components of the two-dimensional scanning optical device 100. When the XY stage 35 is configured such that the folding mirrors 32 and 33 are shifted in a direction which satisfies such angle θ', an incident height of a laser beam with respect to the condensing lens 34 is adjusted and the above described variation can be preferably suppressed.

Further, it is considered that the two-dimensional scanning optical device 100 of the embodiment is mounted to a projector, but the two-dimensional scanning optical device 100 can be preferably used for other image forming devices, such as a printer or an image scanner. Furthermore, the relay optical system is an optical system whose objective is to generate an exit pupil which is conjugate to an entrance pupil. Thus, it is left unquestioned whether it has a positive or negative magnification ratio, how much amount of aberration it has, what type of an optical configuration it has, and whether the both groups are symmetrical or not.

What is claimed is:

1. A scanning optical device that scans a light beam irradiated from a light source through a relay optical system on a surface to be scanned,
   wherein the relay optical system comprising:
      at least one front group lenses arranged at a side of the light source;
      at least one rear group lenses arranged at a side of the surface to be scanned; and
      a first mirror and a second mirror arranged between the front group lenses and the rear group lenses, and supported by a common supporting member so that a position of the first mirror and a position of the second mirror are relatively fixed with respect to each other;
   wherein the first mirror is arranged such that a normal vector of a mirror surface of the first mirror makes an angle (180−ω) (unit: deg) with an incident optical axis from the front group lenses, and the first mirror folds an incident light beam from the front group lenses, wherein the second mirror is arranged such that a normal vector of a mirror surface of the second mirror makes an angle $\alpha$ ($\alpha \neq 180 \times m$, here m is an integer) (unit: deg) with the normal vector of the mirror surface of the first mirror, and the second mirror folds an incident light beam from the first mirror toward the rear group lenses, and wherein the supporting member includes a mechanism, the mechanism being linearly movable in a direction which makes an angle ($\omega-\alpha+90$) (unit: deg) with the normal vector of the mirror surface of the first mirror.

2. The scanning optical device according to claim 1, wherein the supporting member includes a mechanism being linearly movable in a direction which makes an angle ($\omega-\alpha$) (unit: deg) with the normal vector of the mirror surface of the first mirror.

3. The scanning optical device according to claim 1, wherein a following inequality is satisfied:

$|\sin \alpha| < 0.5$.

4. The scanning optical device according to claim 1, wherein the front group lenses and the rear group lenses are substantially telecentric at a side of an image and at a side of an object, respectively.

5. The scanning optical device according to claim 1, further comprising a deflector arranged at immediately after the rear group lenses, the deflector deflecting the incident light beam from the rear group lenses in a predetermined direction, and wherein an exit pupil of the rear group lenses is placed in a neighborhood of a deflection surface of the deflector.

6. The scanning optical device according to claim 1, wherein a line extending the incident optical axis from the front group lenses and the exit pupil intersect at the neighborhood of the deflection surface.

7. A scanning optical device that scans a light beam irradiated from a light source through a relay optical system on a surface to be scanned, wherein the relay optical system comprising:

at least one front group lenses arranged at a side of the light source;

at least one rear group lenses arranged at a side of the surface to be scanned; and a first mirror and a second mirror arranged between the front group lenses and the rear group lenses, and supported by a common supporting member so that a position of the first mirror and a position of the second mirror are relatively fixed with respect to each other, wherein the first mirror is arranged such that a normal vector of a mirror surface of the first mirror makes an angle ($180-\omega$) (unit: deg) with an incident optical axis from the front group lenses, and the first mirror folds an incident light beam from the front group lenses, wherein the second mirror is arranged such that a normal vector of a mirror surface of the second mirror makes an angle $\alpha$ ($\alpha \neq 180 \times m$, here m is an integer) (unit: deg) with the normal vector of the mirror surface of the first mirror, and the second mirror folds an incident light beam from the first mirror toward the rear group lenses, and wherein the supporting member includes a mechanism, the mechanism being linearly movable in a direction which makes an angle ($\omega-\alpha$) (unit: deg) with the normal vector of the mirror surface of the first mirror.

* * * * *